Patented Apr. 6, 1943

2,315,951

UNITED STATES PATENT OFFICE 2,315,951

CONDENSATION PRODUCTS OF DIARYL ETHER SULPHONIC ACIDS WITH FORMALDEHYDE

Arthur L. Fox, Woodstown, N. J., and Paul O. Bare, Wilmington, Del., assignors to E. I. du Pont de Nemours & Company, Wilmington, Del., a corporation of Delaware No Drawing. Application April 25, 1941, Serial No. 390,330

5 Claims. (Cl. 260—49)

This invention relates to the preparation of condensation products of diaryl ether sulphonic acids with formaldehyde and also to the use of these products as synthetic tanning agents, as assistants in the dyeing of leather and as dispersing agents.

This invention has as an object the preparation of new products useful as dispersing agents and as synthetic tanning agents. A further object is to manufacture these new products by novel and easily conducted processes. A still further object is to use these products as assistants in various processes in the leather industry. Other objects will appear hereinafter.

These objects are accomplished in accordance with the following invention by sulphonating a diaryl oxide and condensing the sulphonic acid thus formed with formaldehyde at a temperature that is low enough to avoid excessive discoloration of the condensation product.

The following examples illustrate but do not limit the invention. The amounts of materials used are expressed as parts by weight.

*Example 1.—Condensation product of diphenyl ether mono-sulphonic acid with formaldehyde*

116.5 parts of chlorosulphonic acid is added slowly to 170 parts of diphenyl ether dissolved in 200 parts of ethylene dichloride while the solution is agitated, keeping the temperature below 25° C. Agitation is continued for a few minutes after addition of the chlorosulphonic acid, and the ethylene dichloride is then steam distilled from the reaction mixture. The water solution of diphenyl ether mono-sulphonic acid is then heated to 100–105° C., and 48.7 parts of a 37% aqueous solution of formaldehyde is added below the surface of the liquid over a period of one hour while stirring. The addition of small amounts of water from time to time is necessary to lower the viscosity of the solution. After complete addition of the formaldehyde the product is stirred about fifteen hours at 100–105° C. The resulting solution is then diluted with water to the desired concentration.

*Example 2.—Condensation product of diphenyl ether disulphonic acid with formaldehyde*

The procedure for preparing this product is identical with that for preparing the condensation product of diphenyl ether mono-sulphonic acid with formaldehyde except 233 parts of chlorosuphonic acid is used in the sulphonation and the sulphonation is carried out below 55° C.

The condensation products of diphenyl ether sulphonic acids with formaldehyde are very soluble in water, and concentrated solutions of these products resemble thick syrups. The alkali metal salts of these condensation products are excellent dispersing agents and when used as syntans the corresponding free acids give a very light colored full bodied tan.

Sulphuric acid may be used as the sulphonating agent to obtain the diphenyl ether sulphonic acids but due to the fact that diphenyl ether mono-sulphonic acid is more soluble in sulphuric acid than diphenyl ether, it is more difficult to isolate the monosulphonic acid when sulphuric acid is substituted for chlorosulphonic acid in the procedure outlined in Example 1.

Diphenyl ether disulphonic acid can be obtained by direct sulphonation of diphenyl ether with 2 moles of sulphuric acid monohydrate at 70–80° C.

While the examples above disclose a process in which the step of sulphonation precedes condensation with formaldehyde, it is also possible to condense diphenyl ether with formaldehyde and then sulphonate or to carry out the sulphonation and condensation reactions concurrently. In the claims we use such expressions as "a condensation product of a sulphonic acid of diphenyl ether with formaldehyde" to cover not only the products made by a process in which the step of sulphonation precedes condensation with formaldehyde but also products made by a process in which diphenyl ether is condensed with formaldehyde prior to sulphonation as well as products made by a process in which the sulphonation and condensation reactions are carried out concurrently.

Diaryl ethers in which one or more of the hydrogen atoms has been replaced by a nitro group, by a chlorine or bromine atom, or by an alkyl group such as methyl, octyl, cetyl, etc., may be substituted for diphenyl ether in the above procedure and an excellent syntan obtained. U. S. Patent No. 2,081,876 describes the preparation of a number of alkyl substituted diaryl ether sulphonic acids which may be converted into useful syntans in accordance with the instructions of the present specification by condensation with formaldehyde. As used in the present specification and the subjoined claims the term "aryl" means any univalent aromatic radical of the benzene or naphthalene series, such as phenyl, tolyl or naphthyl, whose free valence belongs to the nucleus and not to a side chain.

The products described above may be represented by the following general formula

$$[(R\!\!-\!\!O\!\!-\!\!R)_x(CH_2)_{x-1}](SO_3M)_y$$

wherein R stands for an aryl radical as defined in the preceding paragraph, $x$ and $y$ are integers, and M stands for a cation, such as hydrogen, alkali metal, or alkaline earth metal. This formula covers simple condensation products which contain but one methylene group as well as the more complex condensation products which contain more than one methylene group. These products have many uses especially in the leather industry.

These products have been found to be valuable assistants for use in dyebaths for dyeing leather which contain acid or direct types of dyes. They appear to function as dispersing and retanning agents in such a dyebath. The addition of from 1 to 5 per cent on the basis of the leather of the condensation product described in Example 1 to a dyebath containing the usual quantity of an acid or direct dyestuff causes leather which is processed as usual to have a lighter and more level shade and a more uniform two sidedness. The colored leather thus obtained has an improved light fastness, plumpness and color distribution. The use of this product in the dyebath also causes increased penetration of certain dyestuffs. If desired, the leather may first be treated with a solution of this condensation product and subsequently dyed with an acid or direct type of dyestuff.

These products may be used for mordanting chrome tanned leather prior to the application of basic dyestuffs thereto. Chrome tanned leather which has been fully set but not dried or fatliquored is placed in a drum. To the leather in the drum is added from 2 to 10 per cent of its weight of the condensation product described in Example 1 and 80 per cent of its weight of water. The drum is rotated for 30 minutes while its contents are maintained at 90 to 110° F. The liquor is drained off, and the pH value of the leather is adjusted to 5.0 by drumming with sodium bicarbonate and water. After rinsing, the leather is dyed with a basic dyestuff in the usual manner. A fuller, brighter and better penetrated shade is obtained than when chrome tanned leather is mordanted with vegetable extracts or a naphthalene type of syntan. The colored leather thus made has improved light fastness, tightness, fullness and roundness properties.

The condensation products described above can also be used for tanning pickled skins. Skins which have been previously beamed and pickled with a solution of hydrochloric or sulphuric acid and sodium chloride or sulphate in water are treated in a rotating drum with sufficient sodium chloride, sodium carbonate and water to adjust their pH value to a point within the range of 3.5 to 4.0. The liquor is drained off. The drum is closed, and a batter is added which is composed of 10 per cent of egg yolk, 5 per cent of flour, 5 per cent of neat's-foot oil and 80 per cent of water based on the weight of the drained or semi-dry pickled skins. The drum is rotated for one hour while maintaining its contents at 100° F. Then 20% of the condensation product described in Example 1 is added, and the drum is rotated for another hour. The skins are removed, dried and finished as usual. The resulting leather is white and fast to light and has unusual fullness, strength and roundness properties.

These condensation products may also be used in conjunction with light fast vegetable extracts to produce an improved light fast combination vegetable and syntan tannage. Skins which have been prepared for tanning with vegetable extracts are placed in a drum. 40 per cent of sumac extract, 2 per cent of the condensation product described in Example 1, 5 per cent of sodium chloride and 80 per cent of water on the basis of the weight of the skins are added. The drum is rotated for four hours. The skins are fatliquored, dried and finished as usual. The resulting leather has improved light fastness, tightness, strength and fullness and is quite uniform.

These condensation products may also be used for retanning formaldehyde tanned leather. This use of these products is more fully disclosed in U. S. Patent No. 2,292,067 to Geister et al. An improved white leather is thereby obtained.

An excellent white leather is obtained if chrome tanned leather is retanned with a solution of the condensation product of diphenyl oxide monosulphonic acid with formaldehyde. The retanned leather is whiter, fuller, firmer and much more resistant to color change from ageing or exposure to light than chrome tanned leather which has been treated with the usual type of syntan, such as a condensation product of naphthalene sulphonic acid with formaldehyde. The other condensation products described above may also be used for retanning chrome tanned leather.

Chrome tanned calfskin is washed and drummed at 100° F. for thirty minutes with 80 per cent of its weight of water and 3 per cent of its weight of the condensation product described in Example 1. The pH of the retanned leather is adjusted to a value of 5 with alkali, and it is then fatliquored and dried in the usual manner. The resultant leather does not discolor after 160 hours exposure in a Fadeometer, whereas chrome tanned calfskin which has been similarly retanned by drumming it with 4 per cent of its weight of the condensation product of naphthalene sulphonic acid with formaldehyde discolors within 4 hours after exposure in a Fadeometer. The use of these products for retanning chrome tanned leather is more fully disclosed and claimed in U. S. Patent No. 2,292,067 to Geister et al.

Various synthetic tanning assistants have been proposed in the past, and the most successful are the sulphonated diaryl methanes and their derivatives. These tanning assistants are usually prepared by sulphonating aromatic compounds such as naphthalene, phenol and the like, and condensing with formaldehyde. As ordinarily prepared these products tend to be rather dark colored, hence their use is somewhat restricted in light colored and especially white leathers. Temperatures approaching 160° C. are required for sulphonating naphthalene to yield the beta-naphthalene sulphonic acid and this tends to give a dark colored product which requires expensive purification to reduce the amount of colored material present. Oxidation of phenol sulphonic acids leads to a colored product which is not suited for tanning light colored and especially white leather. The condensation products of diphenyl ether sulphonic acids with formaldehyde are obtained by sulphonating at a lower temperature than is necessary for sulphonating naphthalene, and since there are no phenolic groups present no oxidation of the condensation product takes place to result in excessive discoloration.

White leather when tanned in the presence of a condensation product of a diphenyl ether sulphonic acid with formaldehyde shows considerably better light fastness than leather tanned in the presence of the formaldehyde condensation product of beta naphthalene sulphonic acid. The condensation product of diphenyl ether monosulphonic acid with formaldehyde also gives a flatter and tighter leather than the formaldehyde condensation product of beta naphthalene sulphonic acid.

Resort may be had to such modifications and equivalents as fall within the spirit of the invention and the scope of the appended claims.

We claim:

1. The condensation product of diphenyl ether monosulphonic acid with formaldehyde, said condensation product having been prepared by heating formaldehyde with said sulphonic acid at a temperature that is low enough to avoid excessive discoloration of the condensation product.

2. The condensation product of diphenyl ether disulphonic acid with formaldehyde, said condensation product having been prepared by heating formaldehyde with said sulphonic acid at a temperature that is low enough to avoid excessive discoloration of the condensation product.

3. A condensation product of a sulphonic acid of diphenyl ether with formaldehyde, said condensation product having been prepared by heating formaldehyde with said sulphonic acid at a temperature that is low enough to avoid excessive discoloration of the condensation product.

4. A formaldehyde condensation product of a sulphonic acid of a diaryl ether, said diaryl ether containing nuclear substituents selected only from the class consisting of hydrogen atoms, nitro groups, chlorine atoms, bromine atoms and alkyl groups, said condensation product having been prepared by heating formaldehyde with said sulphonic acid at a temperature that is low enough to avoid excessive discoloration of the condensation product.

5. A chemical product selected from the group consisting of a formaldehyde condensation product of a sulphonic acid of a diaryl ether and its alkali metal and alkaline earth metal salts, said diaryl ether containing nuclear substituents selected only from the class consisting of hydrogen atoms, nitro groups, chlorine atoms, bromine atoms and alkyl groups, said condensation product having been prepared by heating formaldehyde with said sulphonic acid at a temperature that is low enough to avoid excessive discoloration of the condensation product.

ARTHUR L. FOX.
PAUL O. BARE.